US009286476B2

(12) United States Patent
Sivaramamurthy et al.

(10) Patent No.: US 9,286,476 B2
(45) Date of Patent: Mar. 15, 2016

(54) METHOD AND SYSTEM FOR CONFIGURING CONSTRAINTS FOR A RESOURCE IN AN ELECTRONIC DEVICE

(75) Inventors: Venkat Kumar Sivaramamurthy, Bangalore (IN); Puneet Gupta, Bangalore (IN); Akshay Darbari, Allahabad (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 13/601,647

(22) Filed: Aug. 31, 2012

(65) Prior Publication Data

US 2013/0061330 A1 Mar. 7, 2013

(30) Foreign Application Priority Data

Sep. 5, 2011 (IN) .......................... 3050/CHE/2011

(51) Int. Cl.
| | |
|---|---|
| *H04L 29/04* | (2006.01) |
| *G06F 21/00* | (2013.01) |
| *G06F 21/60* | (2013.01) |
| *H04L 9/32* | (2006.01) |
| *G06F 21/52* | (2013.01) |
| *G06F 11/34* | (2006.01) |
| *G06F 15/173* | (2006.01) |

(52) U.S. Cl.
CPC ................ *G06F 21/604* (2013.01); *H04L 9/32* (2013.01); *G06F 15/173* (2013.01)

(58) Field of Classification Search
CPC ........ G06F 21/604; G06F 15/173; H04L 9/32
USPC ............... 726/27, 22, 2, 3; 709/203; 370/254; 707/1

See application file for complete search history.

(56) References Cited

U.S. PATENT DOCUMENTS

| | | | | |
|---|---|---|---|---|
| 2006/0277595 | A1* | 12/2006 | Kinser et al. ...................... | 726/3 |
| 2007/0203881 | A1* | 8/2007 | Schaad et al. ..................... | 707/1 |
| 2008/0235806 | A1* | 9/2008 | Bantz et al. ..................... | 726/27 |
| 2012/0254116 | A1* | 10/2012 | Thereska et al. .............. | 707/640 |

FOREIGN PATENT DOCUMENTS

WO WO 2013055501 A1 * 4/2013 ............ G06F 21/604

OTHER PUBLICATIONS

Marija Mikic-Rakic, Sam Malek, Nenad Medvidovic; "Architecture-driven software mobility in support of QoS requirements"; May 2008; SAM '08: Proceedings of the 1st international workshop on Software architectures and mobility; Publisher: ACM; pp. 3-8.*

* cited by examiner

*Primary Examiner* — Andrew Nalven
*Assistant Examiner* — Courtney Fields
(74) *Attorney, Agent, or Firm* — LeClairRyan, a Professional Corporation

(57) ABSTRACT

The present invention provides a method and system for configuring constraints for a resource in an electronic device. The method includes identifying context of use/access of a resource and implementing permissions/constraints as per the identified context. The method includes identifying an existing work environment of a resource by capturing information through an application program interface (API), identifying constraints for the resource with respect to the identified work environment from a constraint specification file for the resource which contains constraint details for all work environments, and either configuring the identified constraints for the resource, or modifying the identified work environment for the resource and configuring corresponding constraints for the resource.

9 Claims, 3 Drawing Sheets

METHOD AND SYSTEM FOR CONFIGURING CONSTRAINTS FOR A RESOURCE IN AN ELECTRONIC DEVICE

This application claims the benefit of Indian Patent Application Filing No. 3050/CHE/2011, filed Sep. 5, 2011, which is hereby incorporated by reference in its entirety.

FIELD

The present invention relates to a method and system for configuring constraints for a resource in an electronic device. More specifically it relates to access permissions for a resource in an electronic device, based on the context of usage.

BACKGROUND

Data security has gained priority in recent years for various purposes e.g. leakage of information, misuse of information and other security reasons. User authentication, passwords, access control form a major part of such security measures. Access control has typically been concerned with protected resources. and typically occurs after authentication and authorization. Thus, when a particular identity attempts to access a resource, the privileges associated with the particular identity may be compared against the privileges required to access the resource.

Conventionally a user gets access rights for a particular data based on his authentication only. Such rights are static and may not be configurable. Further, there also exist systems to provide rights to a user dynamically, based on his context of usage. However conventional systems do not include providing dynamic context based permissions for a computer resource. There is also no system to permit modifying the context and avail suitable permissions for a computer resource.

Hence, there is a need for a system and method to provide context based permissions for a resource in an electronic device. Additionally, a system and method that can allow modify context of use to implement particular permissions for a resource in an electronic device.

SUMMARY

In one embodiment of the present invention a method and system is used to configure constraints for a resource in an electronic device by identifying an existing work environment of a resource by capturing information through an application program interface (API); identifying constraints for the resource with respect to the identified work environment from a constraint specification file for the resource, wherein the file comprises constraint details with respect to predefined work environments; and performing either of—configuring the identified constraints for the resource; or—modifying the identified work environment for the resource, and configuring a corresponding constraint for the resource.

The present invention provides a system for configuring constraints for a resource in an electronic device, the system comprising means to identify existing work environment of a resource and identify constraints for the resource with respect to the identified work environment from a constraint specification file; and means to perform one of—configuring the identified constraints for the resource; or modifying the identified work environment for the resource, and configuring a corresponding constraint for the resource.

The present invention also provides a computer program product for configuring constraints for a resource in an electronic device, the computer program product consisting of a plurality of program instructions stored on a tangible computer readable media which when run upon a computer processor carries out steps for configuring constraints for a resource in an electronic device, the program instructions comprising means for identifying an existing work environment of a resource, by capturing information through an application program interface (api); identifying constraints for the resource with respect to the identified work environment from a constraint specification file for the resource, said file comprising constraint details with respect to predefined work environments; and performing one of—configuring the identified constraints for the resource; or—modifying the identified work environment for the resource, and configuring a corresponding constraint for the resource.

BRIEF DESCRIPTION OF THE DRAWINGS

The above mentioned features as well other features, aspects, and advantages of the present invention will become better understood when the following detailed description is read with reference to the accompanying drawings in which like characters represent like parts throughout the drawings, wherein.

DETAILED DESCRIPTION

Figure 1:
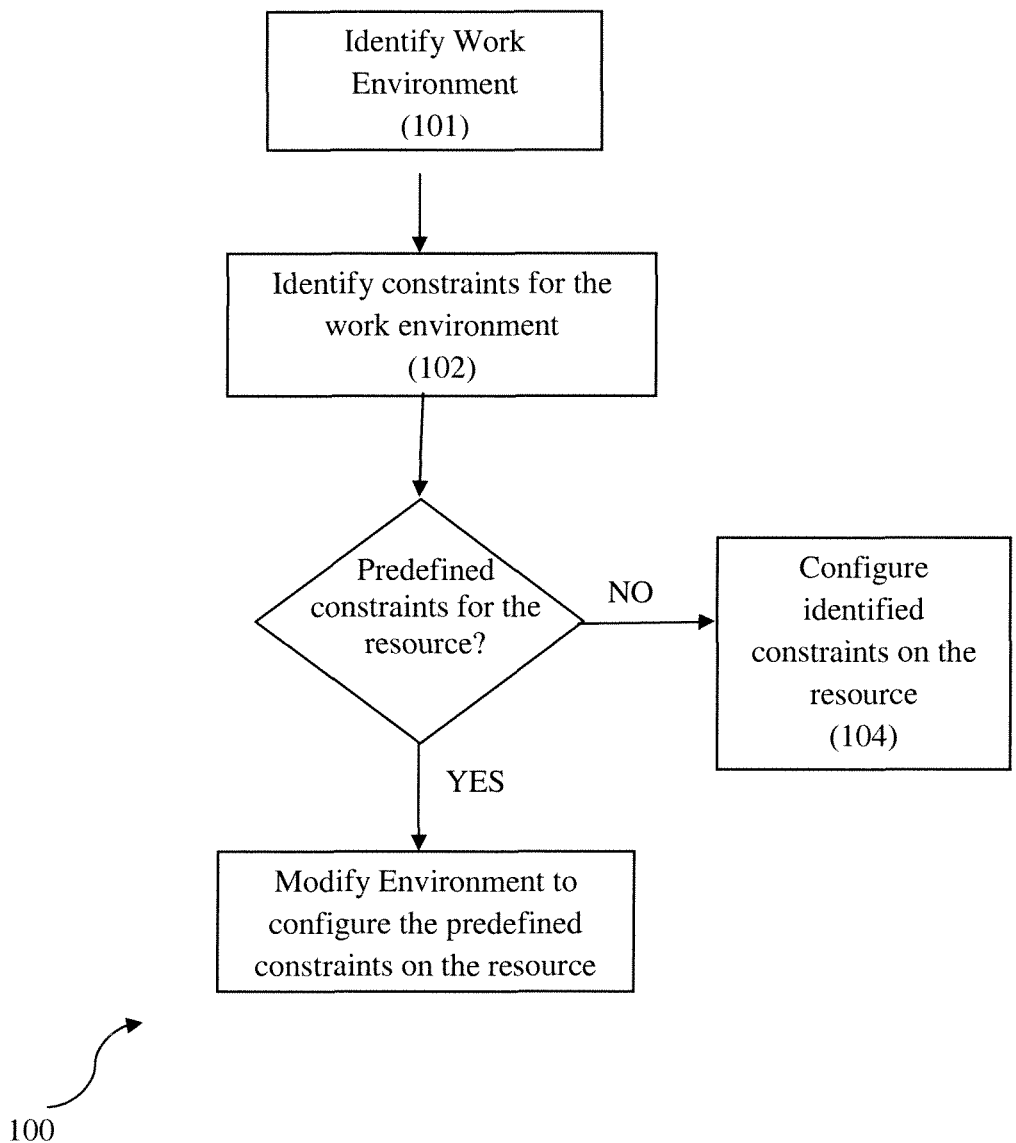
FIG. 1 describes in brief the process of the present invention.

In the following detailed description, examples are provided only for a thorough understanding of the present invention. The examples in no way limit the scope of the invention. The present invention may be embodied in many different forms and should not be construed as limited to the embodiments set forth herein. In other embodiments, well known methods, procedures, components and circuitry have been described at a relatively high-level, without detail, in order to prevent unnecessary obscuring of the aspects of the present invention.

The present invention provides permission and/or constraints for a resource in an electronic device based on the context of use of the resource. For example, a document received by a user may not be made available to other users (i.e. not to be shared). In this scenario, if applications which can be used to share the documents such as email applications are open, the document will have no access. Alternatively, those applications can be closed or cannot be invoked when the document is open. In addition, all communication interfaces such as Wi-Fi, Bluetooth, USB interfaces, and so forth are disabled when the document is open.

The process may be implemented in any electronic device which includes, but is not limited to, a handheld electronic device such as a mobile phone, a personal digital assistant (PDA), a tablet etc and computing devices such as a laptop or any such electronic computing machine. The various applications in the electronic device can help identify the context of use, or the work environment in which a particular resource is used. Such an application may be a global positioning system (GPS) device to identify the location while accessing a resource. Calls are made to an API to extract details of the device/hardware setting from these applications.

As used herein, a resource refers to any file, application, operating system, hardware or artifact stored or installed in the electronic device. Permissions are defined for the resource based on the environment in which it is accessed.

In an embodiment, each resource in an electronic device has a constraint specification file embedded with it. The constraint specification file of the resource is a policy file containing the policies associated with the resource which define the access permissions or constraints applicable for the resource, for a particular work environment. Predefined work environments are stored in the policy file, along with policies applicable for the resource in the particular work environment. For example, for a resource such as a company confidential document, the policy file will have a list of work environments where the document should not open at all, or should open with limited access, or should open with all permissions. In a location outside company premises, the document should not open. In case login credentials used by the user are not one of admin access, the document will have only read only access, and so forth.

The policy file is created along with the creation of the resource. The author can set restrictions for the resource as required.

In another embodiment, the policy file can be downloaded from a global policy server and associated with the resource. This happens in the event a resource does not have its own policy file.

In yet another embodiment, if a resource does not have a policy file, a user having the required rights may define the permissions for the resource, create a policy file and associate it with the resource. The user may also instead contact the administrator and get the policy file created and associated with the resource.

FIG. 1 describes a preferred embodiment of implementing the process of the present invention. When an electronic device tries to access a particular resource, for example, any application, the work environment is detected (101) using an application/agent installed in the electronic device. The work environment as defined above includes all the settings of the electronic device, including but not limited to, security settings, network settings, time stamp, operating system and the like. In an embodiment, these can be detected by calls to API. The agent installed in the electronic device extracts this information.

The agent accesses a policy file or a constraint specification file and extracts permissions applicable for the resource with respect to the identified work environment. The policy file may store the permissions that can be given to a resource for a particular work environment. These permissions or constraints are then implemented for the resource.

In one embodiment of the invention, it may be desired to access a particular resource only in a particular work environment, or having some particular access permission (103). In such a situation, the present work environment state is stored and the work environment is changed to the required work environment/access permissions (105). When the electronic device exits from the resource, the saved work environment status is restored. Referring to the previous example, if an email application was open when the non sharable document is accessed, the email application is closed. Further, Wi-Fi, Bluetooth, USB drive, CD/DVD drives are disabled. When the user finishes accessing the resources, the email application is opened again and Wi-Fi, Bluetooth, USB drive, CD/DVD drives are enabled.

In one embodiment, the work environment for a particular resource includes information about parallel applications installed or executing in the electronic device, such as, for example, a media player application running in parallel when the resource is accessed. The operating system installed, firewall/antivirus installed, and other such software form a part of the work environment. The work environment may also include the hardware settings, for example, speaker attached, or printer attached etc. The external work conditions may also form a part of the work environment, for example, time of use, location of use, user credentials and the like.

In a preferred embodiment, constraints or permissions for the resource include full access, limited access or no access. The work environment detected for the resource determines which of the above permission may be implemented for the resource. Limited access may include 'read only' access or 'no forwarding' or 'no mailing' access etc. It is also possible that a particular resource has to exit because of the present work environment. These permissions are set by the author while creating the resource and the author decides, based on the importance of the resource, which permissions are applicable under what conditions.

In another embodiment, such permissions can be modified or updated, only by the author, at a later date.

In the event that a resource has to be accessed with one or more particular permissions, for example, it should be editable or deletable, the work environment is modified to allow such permissions for the resource. Before modifying the work environment, the state of the existing work environment is preserved. After the resource exits, the previous work environment is restored. For example, if a document policy files specifies that the document cannot be shared through any storage medium such as USB drives or CD/DVD drivers, then when the document is accessed, all the mass storage interfaces are disabled and enabled only after the user has accessed the resource.

Figure 2:
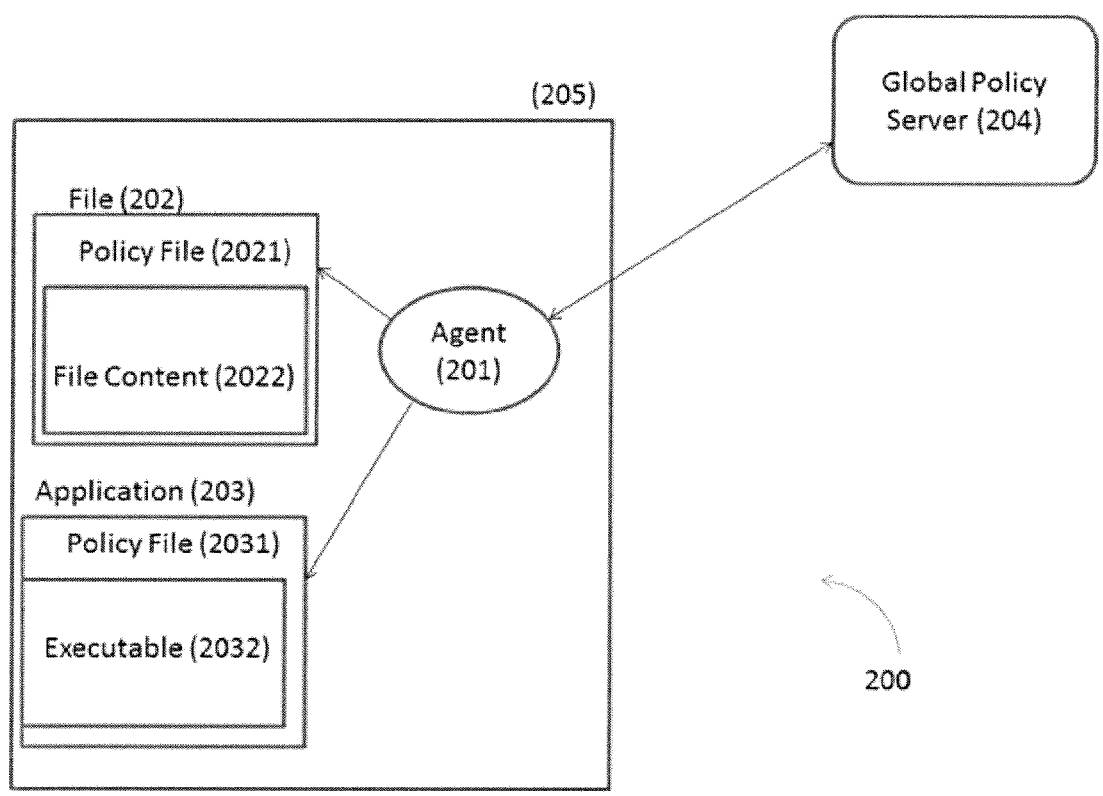
FIG. 2 is a block diagram describing the system in one embodiment of the present invention.

FIG. 2 is a block diagram of the system used for this invention. An electronic device (205) contains the resource (202) to be accessed by user in a certain scenario or work environment. In an embodiment, each electronic device has an agent (201) stored or installed in it to identify this scenario or work environment. This agent makes calls to API to extract information.

Each resource implementing this invention has a constraint specification or policy file (2021) associated with it. The content of the resource (2022) is accessed as per the constraints mentioned in the policy file. In an embodiment, the policy file is created along with the creation of the resource. In another embodiment, the policy file or policies can be downloaded from a global policy server (204) and associated with the resource.

In a preferred embodiment, every resource (203) in the electronic device has a policy file (2031). Such resources include executable files, operating systems, software applications, hardware etc.

The constraints/permissions mentioned in the policy file are implemented as per the environment in which the resource is accessed. The policy file defines which permissions to implement in what context. Parallel executing files (203) also form a part of such environment. In one embodiment, it is required to modify the environment according to the permissions required for a resource.

Figure 3:
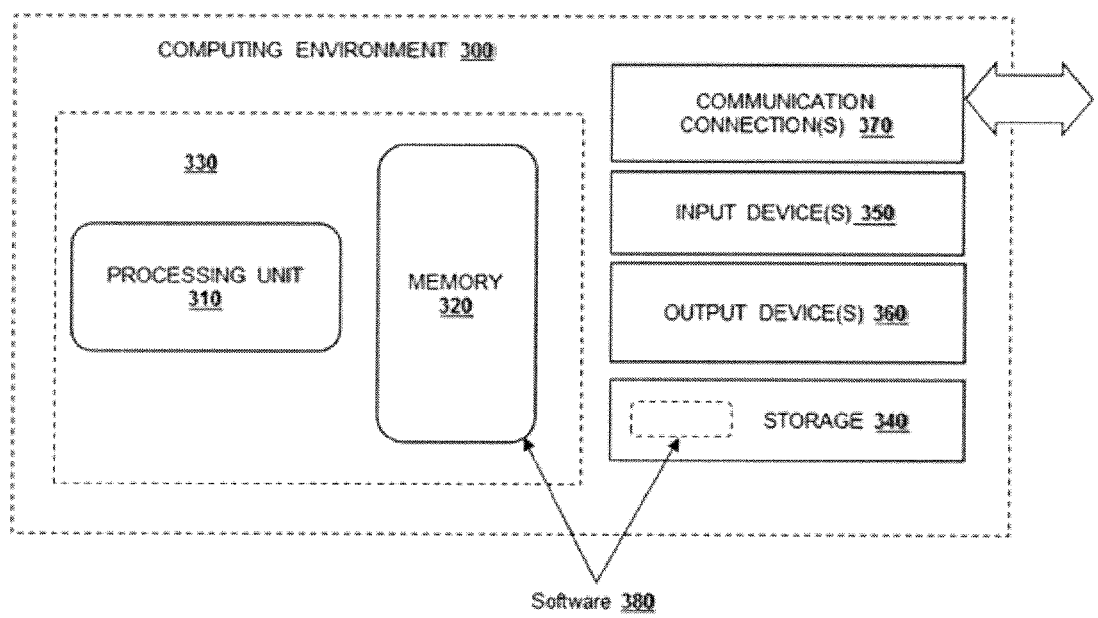
FIG. 3 is a system illustrating a generalized computer network arrangement, in one embodiment of the present technique.

FIG. 3 is a system illustrating a generalized computer network arrangement, in one embodiment of the present technique.

One or more of the above-described techniques can be implemented in or involve one or more computer systems.

FIG. 3 illustrates a generalized example of a computing environment 300. The computing environment 300 is not intended to suggest any limitation as to scope of use or functionality of described embodiments.

With reference to FIG. 3, the computing environment 300 includes at least one processing unit 310 and memory 320. In FIG. 3, this most basic configuration 330 is included within a dashed line. The processing unit 310 executes computer-executable instructions and may be a real or a virtual processor. In a multi-processing system, multiple processing units execute computer-executable instructions to increase processing power. The memory 320 may be volatile memory (e.g., registers, cache, RAM), non-volatile memory (e.g., ROM, EEPROM, flash memory, etc.), or some combination of the two. In some embodiments, the memory 320 stores software 380 implementing described techniques.

A computing environment may have additional features. For example, the computing environment 300 includes storage 340, one or more input devices 350, one or more output devices 360, and one or more communication connections 370. An interconnection mechanism (not shown) such as a bus, controller, or network interconnects the components of the computing environment 300. Typically, operating system software (not shown) provides an operating environment for other software executing in the computing environment 300, and coordinates activities of the components of the computing environment 300.

The storage 340 may be removable or non-removable, and includes magnetic disks, magnetic tapes or cassettes, CD-ROMs, CD-RWs, DVDs, or any other medium which can be used to store information and which can be accessed within the computing environment 300. In some embodiments, the storage 340 stores instructions for the software 380.

The input device(s) 350 may be a touch input device such as a keyboard, mouse, pen, trackball, touch screen, or game controller, a voice input device, a scanning device, a digital camera, or another device that provides input to the computing environment 300. The output device(s) 360 may be a display, printer, speaker, or another device that provides output from the computing environment 300.

The communication connection(s) 370 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 300, computer-readable media include memory 320, storage 340, communication media, and combinations of any of the above.

While the foregoing has described certain embodiments and the best mode of practicing the invention, it is understood that various implementations, modifications and examples of the subject matter disclosed herein may be made. It is intended by the following claims to cover the various implementations, modifications, and variations that may fall within the scope of the subject matter described.

What is claimed is:

1. A method for facilitating resource access, the method comprising:
    obtaining by an electronic device information regarding a hardware or software configuration of an existing work environment of the electronic device via an application program interface (API) in response to a request to access a resource;
    identifying by the electronic device one or more constraints associated with the resource from a constraint specification file for the resource;
    comparing by the electronic device the constraints associated with the resource to the configuration information regarding the hardware or software configuration of the existing work environment derived from the electronic device hosting the resource via the API call;
    determining by the electronic device when the hardware or software configuration of the existing work environment requires modification in order to provide access to the resource based on the comparison and irrespective of any information associated with a user or a source of the access request;
    storing by the electronic device a state of the existing work environment comprising the hardware or software configuration of the existing work environment, modifying the hardware or software configuration of the existing work environment in order to satisfy one or more of the constraints, and providing access to the resource irrespective of any instrumentality by which the access request is made, when the determining indicates that the existing work environment requires modification in order to provide access to the resource; and
    restoring by the electronic device the existing work environment subsequent to an exit of the resource comprising returning the hardware or software configuration to the stored state.

2. The method as claimed in claim 1, wherein the step of providing access further comprises providing full access to the resource or providing partial access to the resource.

3. The method as claimed in claim 1, further comprising denying by the electronic device access to the resource or providing full or partial access to the resource according to one or more permissions specified in the constraint specification file when the existing work environment is not determined to require modification in order to provide access to the resource.

4. An electronic device, comprising:
    a processor coupled to a memory and configured to execute programmed instructions stored in the memory comprising:
        obtaining information regarding a hardware or software configuration of an existing work environment of the electronic device via an application program interface (API) in response to a request to access a resource;
        identifying one or more constraints associated with the resource from a constraint specification file for the resource;
        comparing the constraints associated with the resource to the configuration information regarding the hardware or software configuration of the existing work environment derived from the electronic device hosting the resource via the API call;
        determining when the hardware or software configuration of the existing work environment requires modification in order to provide access to the resource based on the comparison and irrespective of any information associated with a user or a source of the access request;

storing by the electronic device a state of the existing work environment comprising the hardware or software configuration of the existing work environment, modifying the hardware or software configuration of the existing work environment in order to satisfy one or more of the constraints, and providing access to the resource irrespective of any instrumentality by which the access request is made, when the determining indicates that the existing work environment requires modification in order to provide access to the resource; and restoring by the electronic device the existing work environment subsequent to an exit of the resource comprising returning the hardware or software configuration to the stored state.

5. The device as claimed in claim 4, wherein the step of providing access further comprises providing full access to the resource or providing partial access to the resource.

6. The device as claimed in claim 4, wherein the processor is further configured to execute programmed instructions stored in the memory further comprising denying access to the resource or providing full or partial access to the resource according to one or more permissions specified in the constraint specification file when the existing work environment is not determined to require modification in order to provide access to the resource.

7. A non-transitory computer readable medium having stored thereon instructions for facilitating resource access comprising executable code which when executed by a processor, causes the processor to perform steps comprising:

obtaining information regarding a hardware or software configuration of an existing work environment of an electronic device via an application program interface (API) in response to a request to access a resource;

identifying one or more constraints associated with the resource from a constraint specification file for the resource;

comparing the constraints associated with the resource to the configuration information regarding the hardware or software configuration of the existing work environment derived from the electronic device hosting the resource via the API call;

determining when the hardware or software configuration of the existing work environment requires modification in order to provide access to the resource based on the comparison and irrespective of any information associated with a user or a source of the access request;

storing by the electronic device a state of the existing work environment comprising the hardware or software configuration of the existing work environment, modifying the hardware or software configuration of the existing work environment in order to satisfy one or more of the constraints, and providing access to the resource irrespective of any instrumentality by which the access request is made, when the determining indicates that the existing work environment requires modification in order to provide access to the resource; and restoring by the electronic device the existing work environment subsequent to an exit of the resource comprising returning the hardware or software configuration to the stored state.

8. The medium as claimed in claim 7, wherein the step of providing access further comprises providing full access to the resource or providing partial access to the resource.

9. The medium as claimed in claim 7, further having stored thereon instructions that when executed by the processor cause the processor to perform steps further comprising denying access to the resource or providing full or partial access to the resource according to one or more permissions specified in the constraint specification file when the existing work environment is not determined to require modification in order to provide access to the resource.

* * * * *